(12) United States Patent
Ullen et al.

(10) Patent No.: US 8,326,255 B2
(45) Date of Patent: Dec. 4, 2012

(54) BIASING ARRANGEMENT, ELECTRONIC APPARATUS, BIASING METHOD, AND COMPUTER PROGRAM

(75) Inventors: Kaj Ullen, Bjarred (SE); Peter Korner, Lund (SE); Kiril Trajkovski, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 755 days.

(21) Appl. No.: 12/266,988

(22) Filed: Nov. 7, 2008

(65) Prior Publication Data
US 2010/0073072 A1    Mar. 25, 2010

Related U.S. Application Data

(60) Provisional application No. 61/099,660, filed on Sep. 24, 2008.

(51) Int. Cl.
*H04B 1/16* (2006.01)
(52) U.S. Cl. .............. 455/343.2; 455/343.1; 455/343.3; 455/343.5
(58) Field of Classification Search ............ 455/91–355; 327/148, 157, 530, 534–543, 546; 363/59, 363/60; 323/312–317
See application file for complete search history.

(56) References Cited

U.S. PATENT DOCUMENTS

| | | | |
|---|---|---|---|
| 2,742,615 A | 12/1952 | Preisig | |
| 3,626,309 A | 12/1971 | Knowles | |
| 4,268,807 A | 5/1981 | Spence | |
| 5,446,415 A | 8/1995 | Kirisawa | |
| 6,052,603 A | 4/2000 | Kinzalow et al. | |
| 6,559,689 B1 * | 5/2003 | Clark | 327/97 |
| 6,580,797 B1 | 6/2003 | Papadopoulos et al. | |
| 6,826,390 B1 * | 11/2004 | Tamura | 455/226.1 |
| 6,842,525 B1 | 1/2005 | Mellot | |
| 6,978,029 B1 | 12/2005 | Ikeda | |
| 7,505,600 B2 | 3/2009 | Dryer | |

(Continued)

FOREIGN PATENT DOCUMENTS

EP    0 546 571    6/1993

(Continued)

OTHER PUBLICATIONS

International Search Report for corresponding international application No. PCT/EP2009/053458 dated Oct. 22, 2009.

(Continued)

*Primary Examiner* — Lincoln Donovan
*Assistant Examiner* — Brandon S Cole
(74) *Attorney, Agent, or Firm* — Renner, Otto, Boisselle & Sklar, LLP (57) ABSTRACT

A biasing arrangement for an electronic apparatus having an input device connected by wires is disclosed. The biasing arrangement comprises a bias signal generator arranged to provide a bias voltage and a reference voltage; a flying capacitor circuitry having a first set of switches connected to said bias signal generator to selectively connecting and disconnecting the bias voltage and reference voltage, respectively, over a capacitor of the flying capacitor circuitry, and the flying capacitor circuitry further having a second set of switches to selectively connecting and disconnecting the voltage over the capacitor to an output of the flying capacitor circuitry, wherein the first and second sets of switches are not both in a connecting state at any time; and a wired connection between output of the flying capacitor circuitry and the input device of the apparatus. An electronic apparatus, a biasing method, and a computer program are also disclosed.

34 Claims, 6 Drawing Sheets

U.S. PATENT DOCUMENTS

| | | | |
|---|---|---|---|
| 2004/0208327 A1 | 10/2004 | Henson et al. | |
| 2006/0044031 A1* | 3/2006 | Cheung et al. | 327/157 |
| 2006/0147061 A1 | 7/2006 | Niwa et al. | |
| 2007/0297623 A1 | 12/2007 | Kuiri | |
| 2008/0079393 A1* | 4/2008 | Spartano et al. | 320/110 |
| 2008/0164888 A1 | 7/2008 | Suzuki et al. | |
| 2008/0166001 A1 | 7/2008 | Hankey et al. | |
| 2008/0242255 A1* | 10/2008 | Tamura | 455/334 |
| 2009/0284285 A1* | 11/2009 | Fagg | 327/91 |
| 2011/0148388 A1* | 6/2011 | Zanchi et al. | 323/313 |

FOREIGN PATENT DOCUMENTS

| | | |
|---|---|---|
| EP | 0 738 047 | 10/1996 |
| EP | 1 536 663 | 6/2005 |
| EP | 1 742 506 A2 | 1/2007 |
| EP | 1 801 986 | 6/2007 |
| EP | 1 906 704 A1 | 4/2008 |
| JP | 59-231907 | 12/1984 |
| JP | 61-054708 | 3/1986 |
| WO | 99/08638 | 2/1999 |
| WO | WO 2002/056511 | 7/2002 |

OTHER PUBLICATIONS

Written Opinion for corresponding international application No. PCT/EP2009/053458 dated Oct. 22, 2009.

International Search Report, corresponding to PCT/EP2009/053457, mailed on Sep. 4, 2009.

Written Opinion, corresponding to PCT/EP2009/053457, mailed on Sep. 4, 2009.

International Search Report for corresponding application No. PCT/EP2009/053456 dated Oct. 29, 2009.

Written Opinion for corresponding application No. PCT/EP2009/053456 dated Oct. 29, 2009.

Specification, claims, abstract & drawings from U.S. Appl. No. 12/266,894, filed Nov. 7, 2008.

Preliminary Amendment for U.S. Appl. No. 12/266,894, filed Nov. 7, 2008.

Specification, claims, abstract & drawings from U.S. Appl. No. 12/267,115, filed Nov. 7, 2008.

* cited by examiner

BIASING ARRANGEMENT, ELECTRONIC APPARATUS, BIASING METHOD, AND COMPUTER PROGRAM

TECHNICAL FIELD

The present invention relates to a biasing arrangement, an electronic apparatus having such biasing arrangement, a biasing method for such an electronic apparatus, and a computer program for implementing the biasing method.

BACKGROUND

Input devices, such as microphones or other devices providing an analog signal sensitive to introduced noise, being connected by wire and relying on an applied bias voltage may face electromagnetic compatibility problems due to loops being formed e.g. by multiple grounding points. In the case of microphones, high currents to other parts of a device may give rise to voltage fluctuations, which can be discovered in the microphone signal as for example low frequency noise, often called "bumble bee" sound. Other problems that may arise in wired connections using a common reference for input and output devices can be echo effects. These effects normally have to be dealt with by well-balanced designs of how wires and components are positioned and circuitry and signal processing for attenuating known noise. WO 02/056511 discloses an approach for dealing with such noise by enabling generation of a replica of periodic interference that is disturbing a desired signal so as to subtract out an estimation of the periodic interference from the infected signal. The signal is bandpass filtered around an expected frequency of the interfering component, and a fundamental frequency thereof may thereafter be ascertained. Harmonics of the fundamental frequency are generated so as to reconstruct an estimate of the interfering component in the frequency domain using determined weights and Fourier series theory. The interfering component estimate is subtracted to form the received signal to determine a desired component estimate. The weights may be optionally adjusted in a feedback loop.

However, there is also a desire to avoid that these interfering effects occur, or at least alleviate occurrence of them.

SUMMARY

The present invention is based on the understanding that at least some of the effects occur due to fluctuations in biasing of input devices, both in sense of a provided biasing voltage, but also in sense of a reference voltage, such as ground or an intermediate reference voltage between a positive and a negative voltage level of a power supply. The present invention is also based on the understanding that provision of several voltage reference points forming conductive loops, which will catch up electromagnetic energy, contributes to introduction of noise.

According to a first aspect, there is provided a biasing arrangement for an electronic apparatus having an input device connected by wires. The biasing arrangement comprises a bias signal generator arranged to provide a bias voltage and a reference voltage; a flying capacitor circuitry having a first set of switches connected to said bias signal generator to selectively connecting and disconnecting the bias voltage and reference voltage, respectively, over a capacitor of the flying capacitor circuitry, and the flying capacitor circuitry further having a second set of switches to selectively connecting and disconnecting the voltage over the capacitor to an output of the flying capacitor circuitry, wherein the first and second sets of switches are not both in a connecting state at any time; and a wired connection between output of the flying capacitor circuitry and the input device of the apparatus.

The arrangement may further comprise a storage capacitor arranged to be loaded with a charge by the output of the flying capacitor when said second set of switches are in the connecting state, and to provide a voltage to the wired connection.

The wired connection may further comprises a filter for attenuating switching effects of the flying capacitor circuitry. The filter may be a low-pass filter with a cut-off frequency that is lower than a switching frequency of operation of the first and second sets of switches. The filter may be a notch filter with a stop band frequency that is essentially equal to a switching frequency of operation of the first and second sets of switches.

The arrangement may further comprise a controller arranged to provide control signals to the first and second sets of switches. The controller may be arranged to, in repeating sequence, put the second set of switches in an off-state; put the first set of switches in an on-state; after the capacitor has gained a voltage from the bias voltage and the reference voltage, put the first set of switches in an off-state; and put the second set of switches in an on-state. The controller may be arranged to provide a common open time of the first and second sets of switches before putting any of the sets of switches to an on-state.

The reference voltage may be a ground voltage.

According to a second aspect, there is provided an electronic apparatus having an input device connected by wires, and a biasing arrangement, wherein the biasing arrangement comprises a bias signal generator arranged to provide a bias voltage and a reference voltage; a flying capacitor circuitry having a first set of switches connected to said bias signal generator to selectively connecting and disconnecting the bias voltage and reference voltage, respectively, over a capacitor of the flying capacitor circuitry, and the flying capacitor circuitry further having a second set of switches to selectively connecting and disconnecting the voltage over the capacitor to output terminals of the flying capacitor circuitry, wherein the first and second sets of switches are not both in a connecting state at any time; and a wired connection between the output terminals of the flying capacitor circuitry and terminals of the input device of the apparatus.

The biasing arrangement may further comprise a storage capacitor arranged to be loaded with a charge by the output of the flying capacitor when said second set of switches are in the connecting state, and to provide a voltage to the wired connection.

The wired connection may further comprise a filter for attenuating switching effects of the flying capacitor circuitry. The filter may be a low-pass filter with a cut-off frequency that is lower than a switching frequency of operation of the first and second sets of switches. The filter may be a notch filter with a stop band frequency that is essentially equal to a switching frequency of operation of the first and second sets of switches.

The apparatus may further comprise a controller arranged to provide control signals to the first and second sets of switches. The controller may be arranged to, in repeating sequence, put the second set of switches in an off-state; put the first set of switches in an on-state; after the capacitor has gained a voltage from the bias voltage and the reference voltage, put the first set of switches in an off-state; and put the second set of switches in an on-state. The controller may be arranged to provide a common open time of the first and second sets of switches before putting any of the sets of switches to an on-state.

The reference voltage may be a ground voltage.

The input device of the apparatus may comprise a microphone.

The wired connection to the input device may further comprise an antenna, wherein the antenna is connected to a radio receiver of the apparatus and separated from an audio input circuitry of the apparatus by a choke coil.

The apparatus may further comprise an output device which is also connected by wires, wherein the reference voltage part of the wired connection is used as reference voltage also for an output device. The output device of the apparatus may comprise at least one speaker.

The wired connection to the input device may comprise a connector for detaching the input device from the apparatus.

The input device may comprise a biasing resistor; an analog input arrangement; and a signal output, wherein the biasing resistor and the analog input arrangement are connected in series between the terminals of the input device, and the signal output is connected such that the alternating voltage over the biasing resistor is provided as an output signal. The analog input arrangement may comprise a field effect transistor having its drain and source connected to terminals of the analog input arrangement; and a capacitive sensor connected between gate and source of the field effect transistor. The capacitive sensor may be any of a condenser microphone, a microelectromechanical system sensor, and a liquid capacitive inclinometer. The apparatus may further comprise a transistor connected between the biasing resistor and the analog input arrangement with the collector of the transistor connected to the biasing resistor, the emitter of the transistor connected to the analog input arrangement, and the base connected to a voltage for providing a bias point such that a signal swing of the output signal at the connection to the biasing resistor is provided. The signal output may comprise connections to respective terminals of the biasing resistor, and at least one of the connections comprises a capacitor for alternating current coupling of the output signal.

According to a third aspect, there is provided a biasing method for an electronic apparatus having an input device connected by wires. The method comprises generating a bias signal comprising a bias voltage and a reference voltage; controlling a flying capacitor circuitry having a first set of switches connected to said bias signal to selectively connecting and disconnecting the bias voltage and reference voltage, respectively, over a capacitor of the flying capacitor circuitry, and the flying capacitor circuitry further having a second set of switches to selectively connecting and disconnecting the voltage over the capacitor to an output of the flying capacitor circuitry connected to a wired connection between output of the flying capacitor circuitry and the input device of the apparatus, wherein the controlling comprises alternatingly opening the first set of switches and closing the second set of switches, and opening the second set of switches and closing the second set of switches such that the first and second sets of switches are not both in a connecting state at any time.

The method may further comprise loading a storage capacitor with a charge by the output of the flying capacitor when said second set of switches are in the connecting state, and providing a voltage from the storage capacitor to the wired connection.

The method may further comprise filtering the output signal of the flying capacitor circuitry for attenuating switching effects of the flying capacitor circuitry. The filtering may comprise low-pass filtering with a cut-off frequency that is lower than a switching frequency of the alternating operation of the first and second sets of switches. The filtering may comprise notch filtering with a stop band frequency that is essentially equal to a switching frequency of the alternating operation of the first and second sets of switches.

The controlling may further comprise, in repeating sequence, putting the second set of switches in an off-state; putting the first set of switches in an on-state; after the capacitor has gained a voltage from the bias voltage and the reference voltage, putting the first set of switches in an off-state; and putting the second set of switches in an on-state. The controlling may further comprise providing a common open time of the first and second sets of switches before putting any of the sets of switches to an on-state by delaying closing of the switches.

According to a fourth aspect, there is provided a computer readable medium comprising program code comprising instructions which when executed by a processor is arranged to cause the processor to perform generating a bias signal comprising a bias voltage and a reference voltage; controlling a flying capacitor circuitry having a first set of switches connected to said bias signal to selectively connecting and disconnecting the bias voltage and reference voltage, respectively, over a capacitor of the flying capacitor circuitry, and the flying capacitor circuitry further having a second set of switches to selectively connecting and disconnecting the voltage over the capacitor to an output of the flying capacitor circuitry connected to a wired connection between output of the flying capacitor circuitry and the input device of the apparatus, wherein the controlling comprises alternatingly closing the first set of switches and opening the second set of switches, and closing the second set of switches and opening the second set of switches such that the first and second sets of switches are not both in a connecting state at any time.

The program code may further comprise instructions which when executed by a processor is arranged to cause the processor to perform, in repeating sequence, putting the second set of switches in an off-state; putting the first set of switches in an on-state; after the capacitor has gained a voltage from the bias voltage and the reference voltage, putting the first set of switches in an off-state; and putting the second set of switches in an on-state. The program code may further comprise instructions which when executed by a processor is arranged to cause the processor to perform providing of a common open time of the first and second sets of switches before putting any of the sets of switches to an on-state by delaying closing of the switches.

DETAILED DESCRIPTION

For biasing, a biasing resistor can be connected to a supply voltage and to an analog input arrangement. The analog input arrangement is traditionally connected to a reference voltage, e.g. ground, such that biasing resistor and the analog input arrangement are connected in series between the supply voltage and the reference voltage. The signal over the analog input arrangement is traditionally connected by a signal output to provide an output signal. The signal output preferably comprises a capacitor for alternating current (AC) coupling of the output signal.

Figure 1:
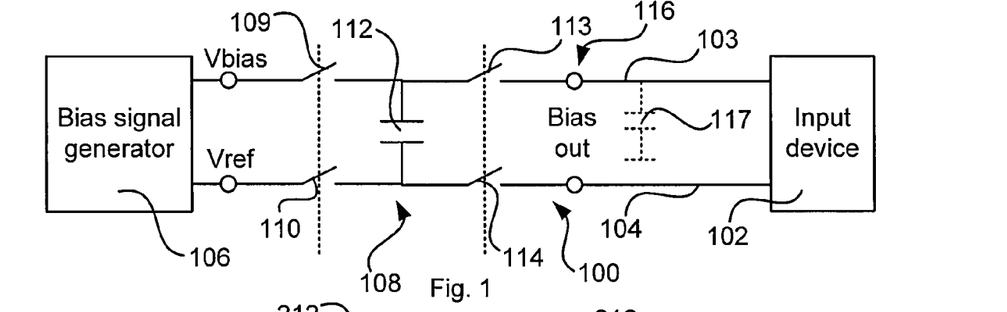
FIG. 1 is a diagram schematically illustrating a biasing arrangement according to an embodiment.

FIG. 1 is a diagram schematically illustrating a biasing arrangement 100 according to an embodiment. The biasing arrangement 100 is applicable e.g. for an electronic apparatus having an input device 102 connected by wires 103, 104. The biasing arrangement comprises a bias signal generator 106 arranged to provide a bias voltage Vbias and a reference voltage Vref. The reference voltage Vref can be ground or an intermediate reference voltage between a positive and a negative voltage level of a power supply. The bias voltage Vbias is a voltage is a voltage assigned to the input device 102 to work properly. Thus, the voltage over the input device will be the voltage difference between the reference voltage Vref and the bias voltage Vbias. The biasing arrangement 100 further comprises a flying capacitor circuitry 108 having a first set of switches 109, 110 connected to said bias signal generator 108 to selectively connecting and disconnecting the bias voltage Vbias and reference voltage Vref, respectively, over a capacitor 112 of the flying capacitor circuitry 108. The flying capacitor circuitry 108 further has a second set of switches 113, 114 to selectively connecting and disconnecting the voltage over the capacitor 112 to an output 116 of the flying capacitor circuitry 108. The switches 109, 110, 113, 114 are operated such that the first set of switches 109, 110 and the second set of switches 113, 114 are not both in a connecting state at any time, i.e. there will be no direct galvanic contact between the bias signal generator 106 and the output 116 at any time. The voltage applied over the capacitor 112 when the first set of switches 109, 110 are closed, i.e. the voltage difference between the reference voltage Vref and the bias voltage Vbias, is held by the capacitor when the first set of switches 109, 110 is opened. The second set of switches 113, 114 is then closed, and the voltage is provided to the output 116. The second set of switches 113, 114 is then opened, and thereafter, the first set of switches 113, 114 is then closed, and the procedure continues as described above. Thereby, the voltages Vref, Vbias are thus provided to the output without any direct galvanic contact between the bias signal generator 106 and the output 116 of the flying capacitor circuitry 108. Thus, there will be no loops with other reference voltage points. The wired connection 103, 104 between the output 116 of the flying capacitor circuitry 108 and the input device 102 of the apparatus will thus be less susceptible to noise. The biasing arrangement 100 preferably comprise a storage capacitor 117 arranged to be loaded with a charge by the output of the flying capacitor circuitry 108 when the second set of switches 113, 114 are in the connecting state. The storage capacitor 117 can be connected between a floating voltage reference and the voltage Vbias, or between the voltages Vref and Vbias. The storage capacitor 117 is then able to provide a voltage, and thus current, to the wired connection 103 by the charge stored in the storage capacitor 117. The storage capacitor 117 can also be arranged at other positions of the circuitry, but the preferred arrangement is as close as possible to the flying capacitor circuitry 108, from an electrical point of view, to enable a fast charging of the storage capacitor 117 when the second set of switches 113, 114 are in the connecting state.

The wired connection can further comprise a filter for attenuating switching effects of the flying capacitor circuitry. Thus, any superposed signal components caused by the switching can be attenuated. The filter is preferably arranged at the output 116. To enable suitable filter design, it is preferable that the switching frequency is selected to be outside of any operation frequency band of the input device, e.g. at an essentially higher frequency. The filter can be a low-pass filter with a cut-off frequency that is lower than the switching frequency of operation of the first and second sets of switches. The low-pass filter can comprise the storage capacitor 117. Alternatively, the filter can be a notch filter with a stop band frequency that is essentially equal to the switching frequency of operation of the first and second sets of switches. This may be particularly suitable when the switching frequency have to be selected within or between frequency bands that the wiring 103, 104 or connected devices are operating in.

The arrangement 100 can comprise a controller arranged to provide control signals to the first and second sets of switches 109, 110, 113, 114. The control signal will provide for that the switches operate according to what is described above. Delays between switching can be applied, e.g. for allowing the capacitor 112 to be properly charged by the bias signal generator 106 and to allow the voltage to be provided properly at the output 116. Further, delays to provide a common open time of the first and second sets of switches 109, 110, 113, 114 can be provided before putting any of the sets of switches to an on-state to ensure the non-galvanic contact between the bias signal generator 106 and the output 116, i.e. that the charge of the capacitor 112 is enabled to stabilize before closing of any of the switches 109, 110, 113, 114. The capacitor 112 is preferably relatively large, e.g. in the magnitude of 1 µF. Thus, the switches 109, 110, 113, 114 are preferably implemented into an integrated component, while the capacitor 112 is attached as a separate component connected properly to the integrated component.

Figure 2:
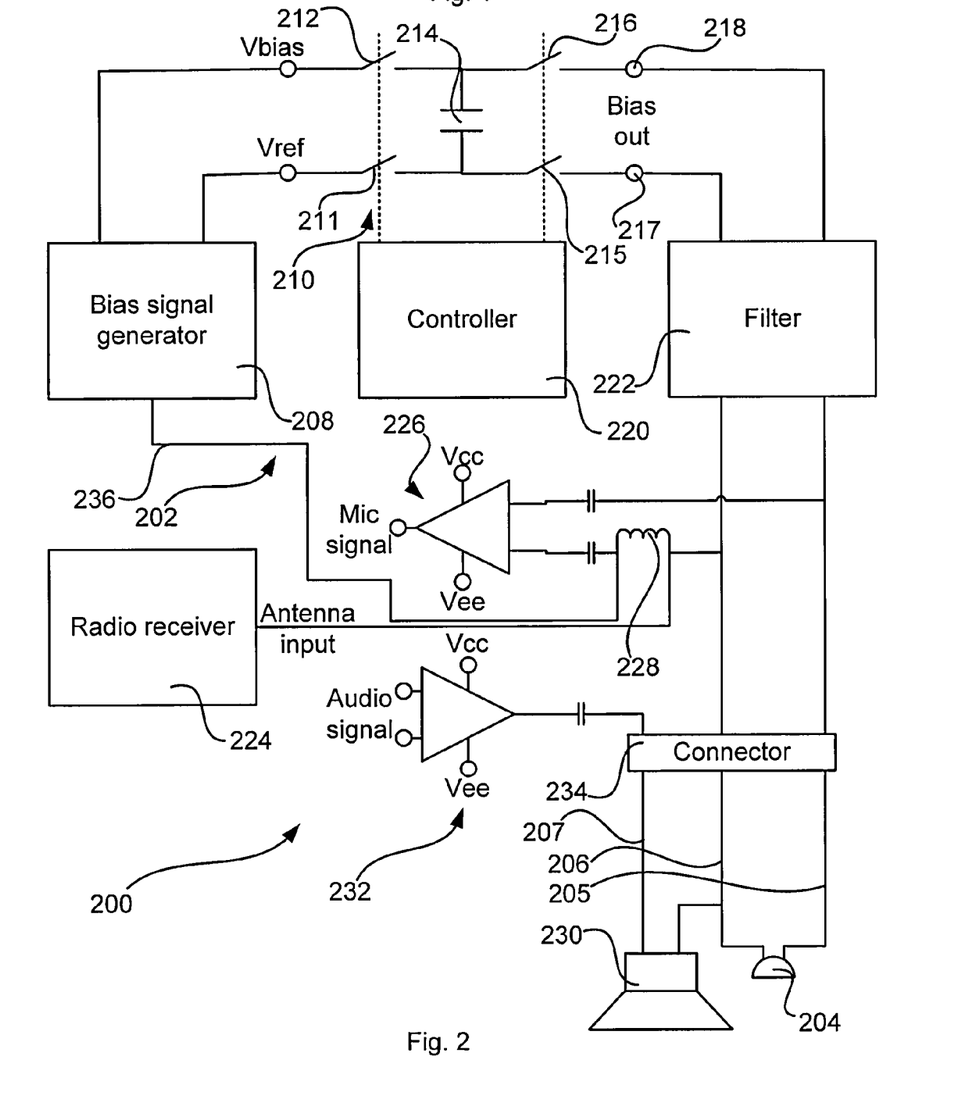
FIG. 2 is a diagram schematically illustrating parts of an apparatus including a biasing arrangement according to an embodiment.

FIG. 2 is a diagram schematically illustrating parts of an electronic apparatus 200 including a biasing arrangement 202 according to an embodiment. The apparatus has an input device 204, e.g. a microphone, connected by wires 205, 206. The biasing arrangement 202 comprises a bias signal generator 208 arranged to provide a bias voltage Vbias and a reference voltage Vref, similar to what is described with reference to FIG. 1. The biasing arrangement 202 further comprises a flying capacitor circuitry 210 having a first set of switches 211, 212 connected to the bias signal generator 208 to selectively connect and disconnect the bias voltage Vbias and reference voltage Vref, respectively, over a capacitor 214 of the flying capacitor circuitry 210, and the flying capacitor circuitry 210 further has a second set of switches 215, 216 to selectively connect and disconnect the voltage over the capacitor 214 to output terminals 217, 218 of the flying capacitor circuitry 210, wherein the first and second sets of switches 211, 212, 215, 216 are controlled by a controller 220 to not both be in a connecting state at any time, as elucidated above with reference to FIG. 1. The biasing arrangement 202 can comprise a storage capacitor, as demonstrated with reference to FIG. 1. The wired connection can further comprise a filter 222 for attenuating switching effects of the flying capacitor circuitry. The filter 222 can be a low-pass filter with a cut-off frequency that is lower than a switching frequency of operation of the first and second sets of switches 211, 212, 215, 216. The storage capacitor can be a part of the low-pass filter. Alternatively, the filter can be a notch filter with a stop band frequency that is essentially equal to a switching frequency of operation of the first and second sets of switches 211, 212, 215, 216. The controller 220 is arranged to provide control signals to the first and second sets of switches 211, 212, 215, 216. The controller is preferably arranged to, in repeating sequence, put the second set of switches 215, 216 in an off-state; put the first set of switches 211, 212 in an on-state; after the capacitor has gained a voltage from the bias voltage Vbias and the reference voltage Vref, put the first set of switches 211, 212 in an off-state; and put the second set of switches 215, 216 in an on-state. The controller is preferably arranged to provide a common open time of the first and second sets of switches 211, 212, 215, 216 before putting any of the sets of switches 211, 212, 215, 216 to an on-state, as elucidated above with reference to FIG. 1.

The reference voltage can be a ground voltage, or an intermediate reference voltage between a positive voltage level Vcc and a negative voltage level Vcc of a power supply. The wired connection to the input device can further comprise an antenna, wherein the antenna is connected to a radio receiver 224 of the apparatus 200 and separated from an audio input circuitry 226 of the apparatus 200 by a choke coil 228. The apparatus 200 can further comprise an output device 230, e.g. one or more speakers, which is also connected by wires 206, 207, wherein the reference voltage part 206 of the wired connection is used as reference voltage also for an output device 230. The output device 230 is for example driven by an output signal circuitry 232, which has its output connected to the wire 207. The wired connection to the input device 204, and preferably also the output device 230, can comprise a connector 234 for detaching the input device 204, and preferably also the output device 230, from the apparatus 200, as will be further illustrated below with reference to FIG. 8. The bias voltage can be generated by the bias signal generator 208 by observing a feedback signal 236 from the input of the audio input circuit 226, e.g. at its reference voltage line, such that a feedback loop is provided.

Figure 3:
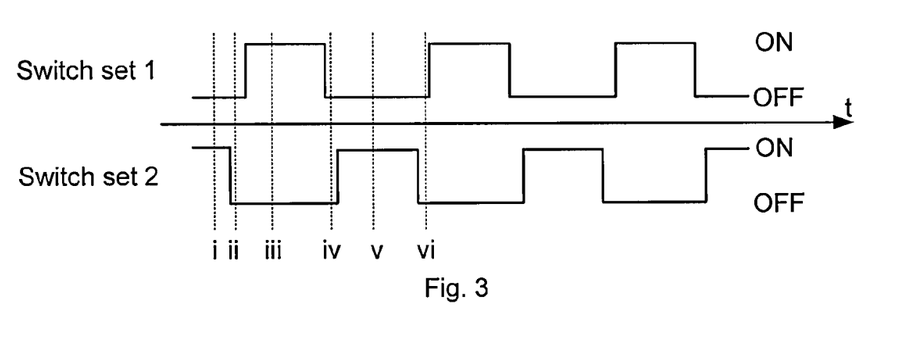
FIG. 3 is a control signal scheme for switch sets according to an embodiment.

FIG. 3 is a control signal scheme for the switch sets explained above, according to an embodiment. The control signals are illustrated over time t such that a higher level indicates that the corresponding switches of the set are closed and that a lower level indicates that the corresponding switches of the set are open. The upper illustrated control signal in FIG. 3 illustrates operation of the set of switches being closest to the bias signal generator, while the lower illustrated control signal in FIG. 3 illustrates operation of the set of switches being closest to the output of the biasing arrangement. As can be seen in FIG. 3, the two signals are never high at the same time, which will avoid that the first set of switches and the second set of switches are both in a connecting state at any time, i.e. there will be no direct galvanic contact between the bias signal generator and the output of the biasing arrangement at any time. In the illustrated embodiment, the opening time of the first and second sets of switches are equal. However, these can be chosen arbitrarily, where the opening time of the first set of switches only need to be sufficient for the charging of the capacitor, while the closing time of the second set of switches preferably is not longer than the input device, any following filter, or other following circuitry has reactive features enough to keep the biasing voltage while the second set of switches are open. A number of dotted lines, numbered i to vi, indicates time instants for which switching states will be elucidated with reference to FIGS. 4a to 4f, respectively.

FIGS. 4a to 4f schematically illustrate states of switch sets at the time instants indicated by dotted lines, numbered i to vi, respectively, in FIG. 3.

Figure 4A:
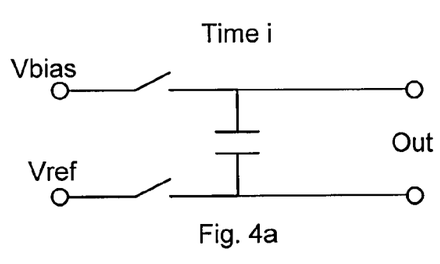
FIGS. 4a to 4f schematically illustrate states of switch sets at time instants indicated in FIG. 3.

FIG. 4a indicates switching state at time instant i, where it can be seen in FIG. 3 that the control signal for the first switch set is low and the control signal for the second switch set is high. Thus, the switches of the first switch set are open and the switches of the second switch set is closed, as illustrated in FIG. 4a. Any charge of the capacitor will thus work as a voltage source towards the output of the flying capacitor circuitry in this state.

Figure 4B:
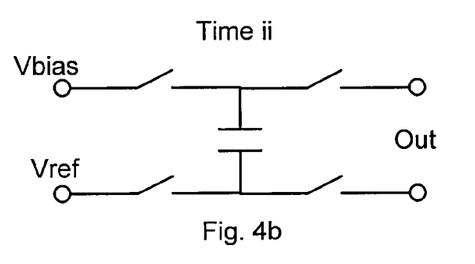

FIG. 4b indicates switching state at time instant ii, where it can be seen in FIG. 3 that the control signals for both the first switch and for the second switch set are low. Thus, the switches of both the first switch set and the second switch set are open, as illustrated in FIG. 4b.

Figure 4C:
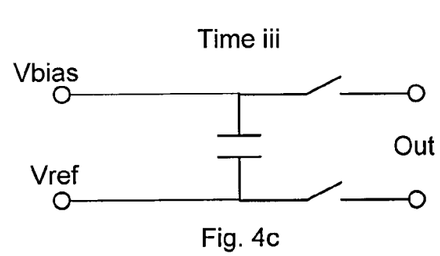

FIG. 4c indicates switching state at time instant iii, where it can be seen in FIG. 3 that the control signal for the first switch set is high and the control signal for the second switch set is low. Thus, the switches of the first switch set are closed and the switches of the second switch set are open, as illustrated in FIG. 4c. The bias signal generator will thus charge the capacitor of the flying capacitor circuitry in this state.

Figure 4D:
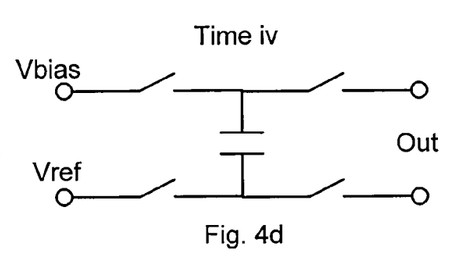

FIG. 4d indicates switching state at time instant iv, where it can be seen in FIG. 3 that the control signals for both the first switch and for the second switch set are low. Thus, the switches of both the first switch set and the second switch set are open, as illustrated in FIG. 4d.

Figure 4E:
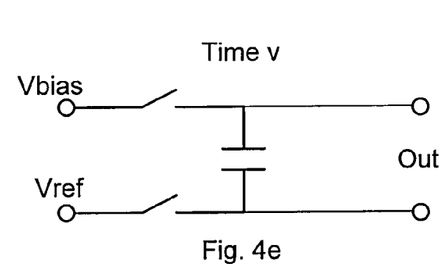

FIG. 4e indicates switching state at time instant v, where it can be seen in FIG. 3 that the control signal for the first switch set is low and the control signal for the second switch set is high. Thus, the switches of the first switch set are open and the switches of the second switch set is closed, as illustrated in FIG. 4e. The charge of the capacitor, that was provided by the bias signal generator as at time instant iii, will thus work as a voltage source towards the output of the flying capacitor circuitry in this state.

Figure 4F:
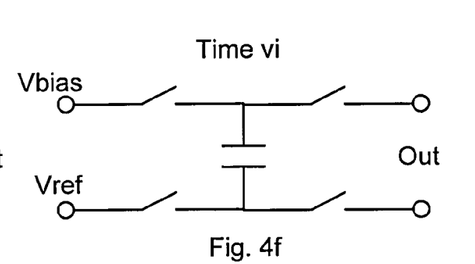

FIG. 4f indicates switching state at time instant vi, where it can be seen in FIG. 3 that the control signals for both the first switch and for the second switch set are low. Thus, the switches of both the first switch set and the second switch set are open, as illustrated in FIG. 4f. And like this, the procedure goes on.

At instants ii to iv and vi, as illustrated in FIGS. 4b to 4d and 4f, respectively, there is no biasing provided by the biasing arrangement, but as long as the open time of the second switch set is kept low, e.g. by having a sufficiently high switching rate, and following circuitry, e.g. a low-pass filter, or the input device itself, has sufficient reactive features for the switching rate, the biasing level will be kept during this short time.

Figure 5:
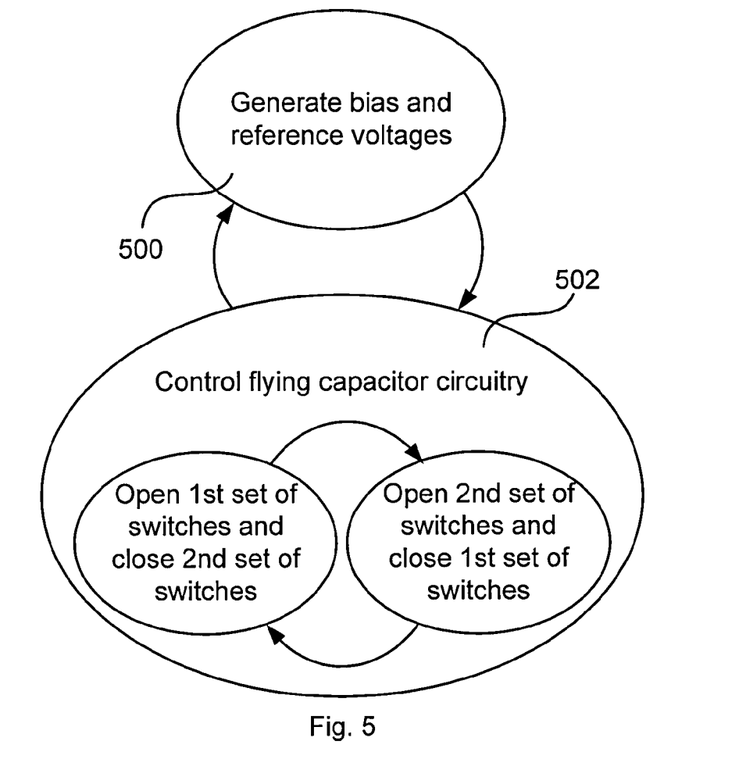
FIG. 5 is a state diagram illustrating a method according to an embodiment.

FIG. 5 is a state diagram illustrating a method according to an embodiment. The method in general comprises two interacting main processes: a first bias signal generation process 500 for provision of a bias signal, and a flying capacitor circuitry operation process 502 for providing the generated bias signal to an output of the biasing arrangement, and to the input device, as elucidated above.

The bias signal generation process 500 comprises generating a bias signal comprising a bias voltage and a reference voltage. The reference voltage can be ground or an intermediate reference voltage having a level between a positive and a negative voltage level of a power supply. The bias voltage is a voltage is a voltage assigned to the input device to work properly, which can be generated by observing a feedback signal from the input of the input device, e.g. at its reference voltage line, such that a feedback loop is provided.

The flying capacitor circuitry operation process 502 comprises controlling the flying capacitor circuitry, being arranged according to any of the above demonstrated embodiments, by alternatingly opening the first set of switches and closing the second set of switches, and opening the second set of switches and closing the second set of switches such that the first and second sets of switches are not both in a connecting state at any time. As elucidated above, the voltages reference voltage and the bias voltage are thus provided to the output without any direct galvanic contact between the bias signal generator and the output of the flying capacitor circuitry.

The method can in addition to the main processes described above further comprise filtering the output signal of the flying capacitor circuitry for attenuating switching effects of the flying capacitor circuitry. The filtering can be low-pass filtering with a cut-off frequency that is lower than a switching frequency of the alternating operation of the first and second sets of switches. This is to reduce any effects on the bias voltage and reference voltage introduced due to the switching. The filtering can alternatively be notch filtering with a stop band frequency that is essentially equal to a switching frequency of the alternating operation of the first and second sets of switches for the same reason. This is particularly suitable when switching frequency have to be chosen to a frequency that is within or between frequency bands that circuitry connected to the output of the biasing arrangement is operating in.

The controlling of the switches of the flying capacitor circuitry roughly comprises, in repeating sequence, putting the second set of switches in an off-state; putting the first set of switches in an on-state; after the capacitor has gained a voltage from the bias voltage and the reference voltage, putting the first set of switches in an off-state; and putting the second set of switches in an on-state. The controlling can comprise providing a common open time of the first and second sets of switches before putting any of the sets of switches to an on-state by delaying closing of the switches to ensure that the capacitor state is stable, and that no direct galvanic contact is provided between the bias signal generator and the output of the flying capacitor circuitry.

Figure 6:
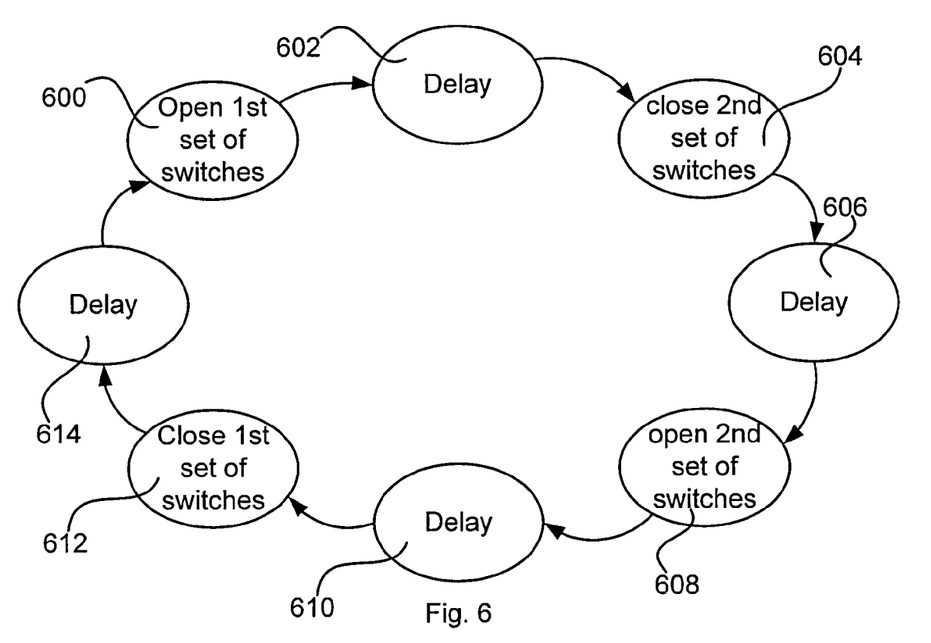
FIG. 6 is a state diagram illustrating operation of switch sets according to an embodiment.

FIG. 6 is a state diagram illustrating operation of the switch sets of the flying capacitor circuitry according to an embodiment. In a first state 600, switches of the first switch set are set to an open state. In a second state 602, a delay is provided to provide a common open time, as elucidated above. In a third state 604, the switches of the second switch set are set to a closed state. Any charge of the capacitor will thus work as a voltage source towards the output of the flying capacitor circuitry in this state. In a fourth state 606, a delay is provided while the input device is biased. In a fifth state 608, the switches of the second switch set are set of an open state. In a sixth state 610, a delay is provided to provide a common open time, as elucidated above. In a seventh state 612, the switches of the first switch set are set to a closed state such that the bias signal generator can charge the capacitor of the flying capacitor circuitry to hold the difference voltage between the reference voltage and the bias voltage. In an eighth state 614, a delay is provided to enable the capacitor to be charged. The procedure then returns to the first state 600 where the switches of the first switch set again are set to an open state.

Any unwanted AC components of the supply voltage provided by the biasing arrangement, which ideally should have pure direct current (DC) properties, may propagate through the series coupling, i.e. the analog input device and the biasing resistor, and the signal output and add noise to the output signal. Below, a few approaches how to cope with such unwanted AC components will be demonstrated.

Figure 7:
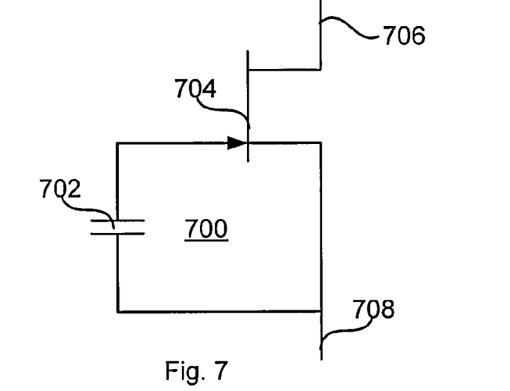
FIG. 7 schematically illustrates a computer readable medium according to an embodiment.

FIG. 7 is a diagram schematically illustrating an exemplary analog input arrangement 700 with an analog input 702 and a field effect transistor (FET) 704. The FET has its drain and source connected to terminals 706, 708 of the analog input arrangement 700. The analog input 702 is preferably a capacitive sensor connected between gate and source of the FET 704. The capacitive sensor can for example be a condenser microphone, a microelectromechanical system sensor, or a liquid capacitive inclinometer. Upon registration of a physical phenomenon, such as sound, force or inclination, the capacitance of the analog input 702 changes. Thus, an applied charge, which is provided by the biasing arrangement as demonstrated above, on the analog input 702 causes the voltage over the analog input 702 to change. The analog input 702 can also be an electronic circuit or device providing input over the gate and source of the field effect transistor.

Figure 8:
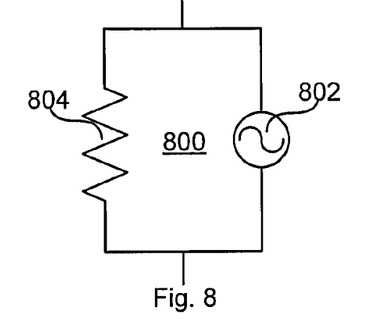
FIG. 8 illustrates an apparatus according to an embodiment.

FIG. 8 is a diagram schematically illustrating an equivalent circuit 300 to the analog input arrangement 700 discussed with reference to FIG. 7. The analog input arrangement 800 can be seen as a current source 802 having very high signal impedance 804, which is normally much higher than a biasing resistor. If applied in a circuit arrangement as illustrated in FIG. 7, most of the noise of the supply voltage will be present over this equivalent high signal impedance 804.

Figure 9:
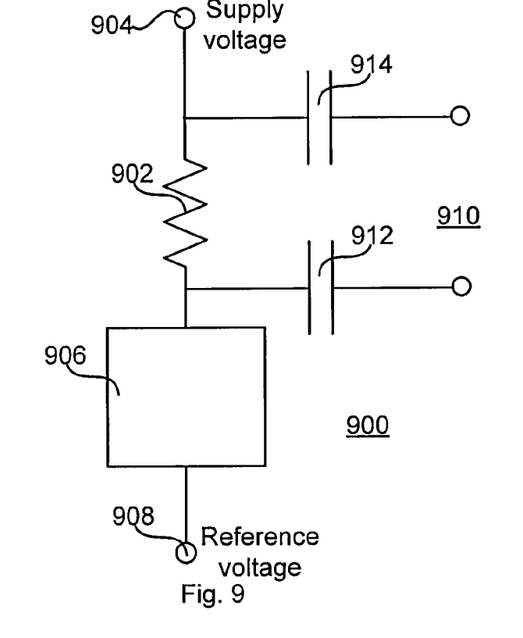
FIG. 9 is a diagram schematically illustrating a circuit arrangement according to an embodiment.

FIG. 9 is a diagram schematically illustrating a circuit arrangement 900 according to an embodiment. The circuit arrangement 900 comprises a biasing arrangement 902. The biasing arrangement 902 comprises a biasing resistor connected to a supply voltage 904, which is provided according to any of the embodiments demonstrated with reference to FIG. 1, and to an analog input arrangement 906. The analog input arrangement 906 is connected to a reference voltage 908, e.g. Vref as demonstrated in FIG. 1, which preferably have a lower voltage than the supply voltage 904, e.g. Vbias as demonstrated in FIG. 1, such that the biasing arrangement 902 and the analog input arrangement 906 are connected in series between the supply voltage 904 and the reference voltage 908. The signal over the biasing resistor 902 is connected by a signal output 910 to provide an output signal from the circuit arrangement 900. The signal output 910 preferably comprises capacitors 912, 914 for AC coupling of the output signal. The analog input arrangement 906 is preferably according to any of the examples described with reference to FIG. 7.

The configuration of FIG. 9 implies that inherent properties of the analog input arrangement 906, as demonstrated with reference to FIG. 8, provides for a rejection of noise present in the supply voltage 904 since only a minor part is present over the biasing resistor 902 since it has much lower impedance compared to the impedance of the analog input arrangement 906. The configuration of FIG. 9 implies that inherent properties of the analog input arrangement 906, as demonstrated with reference to FIG. 3, provides for a rejection of noise present in the supply voltage 904. A noise rejection of typically 26 dB can be achieved. A substantive common mode rejection can also be achieved.

For the configuration demonstrated with reference to FIG. 9, an effect is achieved by getting the signal over a biasing resistor. However, similar effect can be achieved by configurations giving equal electrical properties, such as arranging voltages as a positive and a negative supply voltage, changing positions of any component, substituting a component with another having similar properties, or adding elements for tuning of the circuit. The biasing arrangement 902 need not be arranged in the same device as the analog input arrangement 906 if they are used in connected and interacting devices, such as a headset connected to a mobile phone.

Figure 10:
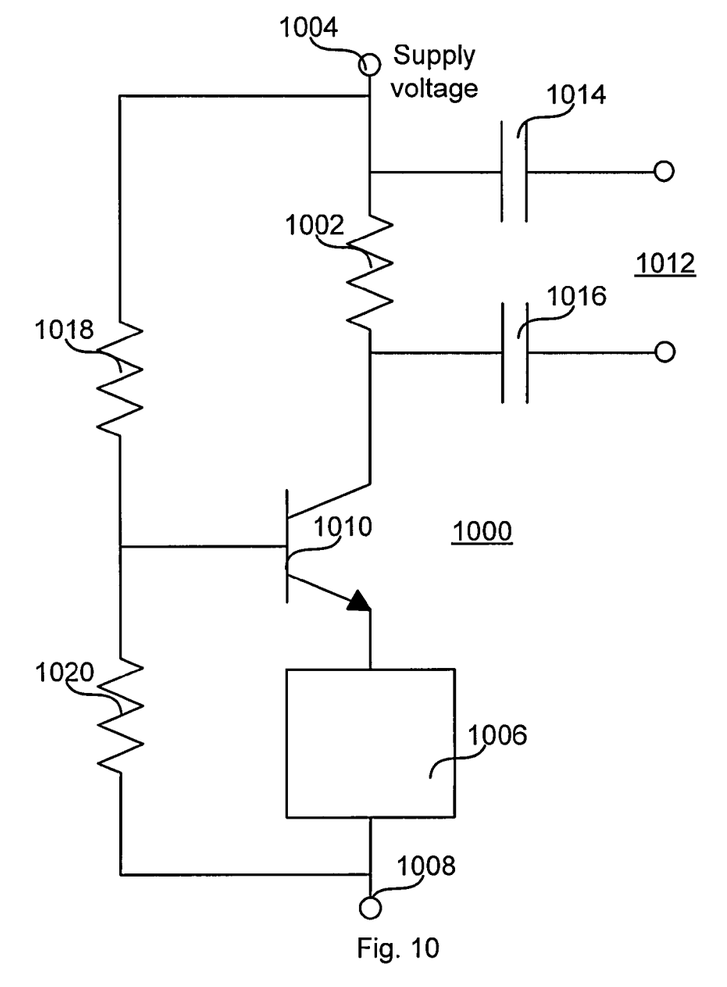
FIG. 10 is a diagram schematically illustrating a circuit arrangement according to an embodiment.

FIG. 10 is a diagram schematically illustrating a circuit arrangement 1000 according to an embodiment. The circuit arrangement 1000 comprises a biasing arrangement 1002. The biasing arrangement 1002 comprises a biasing resistor connected to a supply voltage 1004, which is provided according to any of the embodiments demonstrated with reference to FIG. 1. An analog input arrangement 1006 is connected to a reference voltage 1008, e.g. Vref as demonstrated in FIG. 1, which preferably has a lower voltage than the supply voltage 1004, e.g. Vbias as demonstrated in FIG. 1. A transistor 1010 is connected between the biasing resistor 1002 and the analog input arrangement 1006 with the collector of the transistor 1010 connected to the biasing resistor 1002, the emitter of the transistor connected to the analog input arrangement 1006, such that the biasing arrangement 1002, the transistor 1010 and the analog input arrangement 1006 are connected in series between the supply voltage 1004 and the reference voltage 1008. The signal over the biasing resistor 1002 is connected by a signal output 1012 to provide an output signal from the circuit arrangement 1000. The signal output 1012 preferably comprises capacitors 1014, 1016 for AC coupling of the output signal. The analog input arrangement 1006 is preferably according to any of the examples described with reference to FIG. 7. The base of the transistor 1010 is connected to a voltage, e.g. provided by a voltage divider 1018, 1020, for providing a bias point such that a signal swing of the output signal at the connection to the biasing resistor 1002 is provided.

In the configuration of FIG. 10, considering the configuration of the analog input arrangement 700 demonstrated with reference to FIG. 7, the transistor 1010 and the FET 704 will be in cascode, which has been found to be beneficial. The signal of the analog input arrangement 1006 is no longer superposed on its driving voltage. If the base of the transistor 1010 is properly connected to a low impedance 1020, the transistor 1010 will work as an emitter follower, which has low impedance at its emitter, which provides the driving voltage to the analog input arrangement 1006. The signal from the analog input arrangement 1006 will be present at the collector of the transistor 1010, and by the properly applied voltage to the base, the collector will swing to provide the output signal over the biasing resistor 1002. The voltage to the base of the transistor 1010 can be controlled to achieve further effects, such as adapting sensitivity of the analog input arrangement. In the illustration of FIG. 10, the transistor 1010 is a bipolar npn transistor, which is particularly beneficial since it provides low output impedance and good control properties regarding voltage applied on the base. However, if high power is to be output or for other reasons, a more robust transistor or another suitable active device such as a MOSFET can be used.

The approach is based on the understanding that at least some of the effects occur due to fluctuations in biasing of input devices in sense of a provided biasing voltage. The approach is also based on the understanding that provision of the analog signal output to an amplifier, taken over the high impedance field effect transistor contributes to taking up a considerable amount of the noise, while an analog signal taken over a series resistor, which is also used for the biasing and having a considerable lower impedance than the arrangement with the analog input and the field effect transistor, reduces the noise component provided to the amplifier. The approach can be used as a substitute, or a complement, to the filter demonstrated with reference to FIGS. 1 and 2.

For the embodiments of the approach demonstrated with reference to FIGS. 9 and 10, i.e. getting the signal over a biasing resistor, the scheme of FIG. 2 will be slightly modified in the connection of the signal to the audio input circuit. This modification has been elucidated with reference to FIGS. 9 and 10, and therefore, no separate scheme illustrating this embodiment of the electronic apparatus is considered necessary for a person skilled in the art to be able to do the modification.

Figure 11:
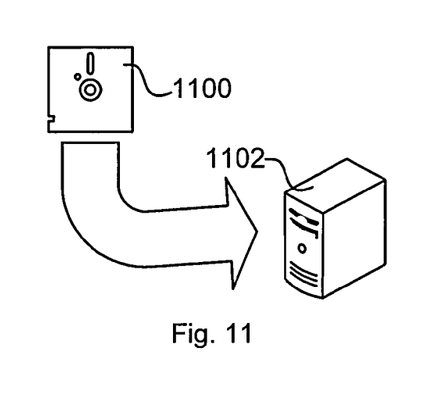
FIG. 11 schematically illustrates a computer readable medium according to an embodiment.

FIG. 11 schematically illustrates a computer readable medium according to an embodiment. The method according to the present invention is suitable for implementation with aid of processing means, such as computers and/or processors. Therefore, there is provided computer programs comprising instructions arranged to cause the processing means, processor, or computer to perform the steps of the methods according to any of the embodiments described with reference to FIGS. 5 and 6, respectively. The computer program preferably comprises program code which is stored on a computer readable medium 1100, as illustrated in FIG. 11, which can be loaded and executed by a processing means, processor, or computer 1102 to cause it to perform the method according to the present invention, preferably as any of the embodiments described with reference to FIGS. 5 and 6. The computer 1102 and computer program product 1100 can be arranged to execute the program code sequentially where actions of the any of the methods are performed stepwise, but mostly be arranged to execute the program code on a real-time basis where actions of any of the methods are performed upon need and availability of data, e.g. where the main processes 500 and 502 described with reference to FIG. 5 can be performed in parallel. The processing means, processor, or computer 1102 is preferably what normally is referred to as an embedded system. Thus, the depicted computer readable medium 1100 and computer 1102 in FIG. 11 should be construed to be for illustrative purposes only to provide understanding of the principle, and not to be construed as any direct illustration of the elements. The computer 1102 can, as demonstrated above, be part of an electronic apparatus, e.g. a mobile phone, a digital camera, a personal digital assistant, etc. having the features described with reference to FIG. 2.

Figure 12:
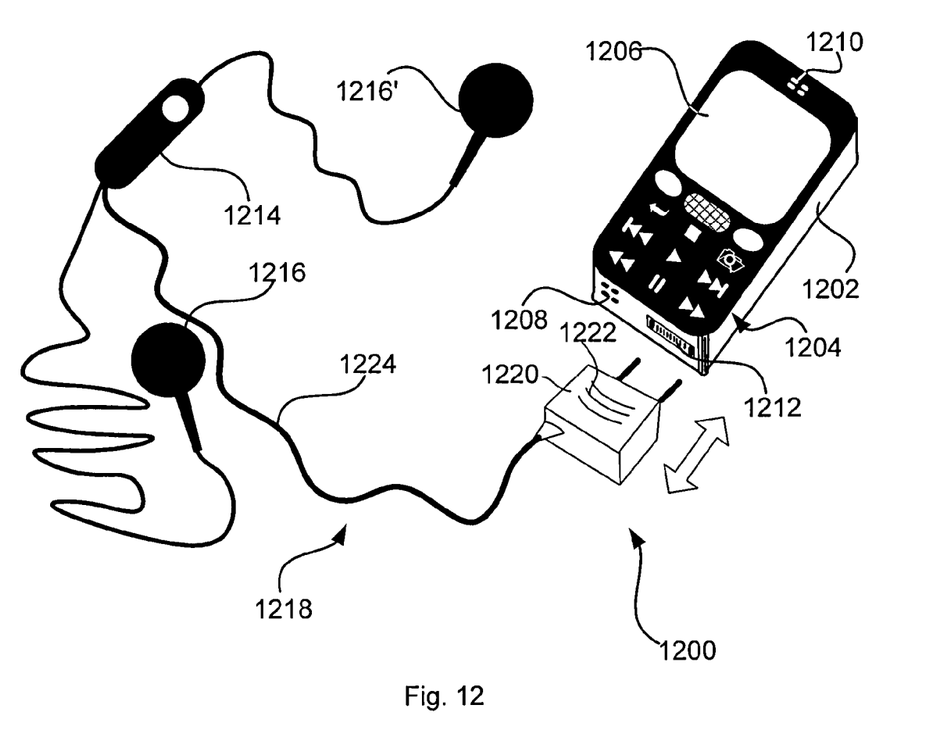
FIG. 12 illustrates an electronic apparatus according to an embodiment.

FIG. 12 illustrates an electronic apparatus 1200 according to an embodiment, where the principles of the invention are applicable. The apparatus 1200 can represent an example of the apparatus 200 illustrated by the schematic diagram of FIG. 2. The electronic apparatus 1200 can for example be a mobile phone or a media player/recorder. The apparatus 1200 comprises a main body 1202 having power source, circuitry, user interface, etc. The user interface can comprise a keypad 1204, a display 1206, a microphone 1208 and a speaker 1210. The apparatus also comprises a connector 1212 to which an external microphone 1214 and external speakers 1216, 1216', e.g. forming a headset 1218, can be connected by a connector 1220 of the headset 1218. The connectors 1212, 1220 are arranged to mate each other and provide electrical contacts between the main body circuitry and the input and output devices 1214, 1216, 1216' of the headset 1218 for input and output of signals. The connectors 1212, 1220 can thus be connected and disconnected to each other, which may be facilitated by grippable surfaces 1222 of the connector 1220 of the headset 1218. A wire of a cord 1224 of the headset 1218 can also work as a radio antenna for the apparatus 1200, e.g. in the FM band between 87.5-108.0 MHz, as demonstrated above with reference to FIG. 2.

The invention claimed is:

1. An electronic apparatus having an input device connected by wires, and a biasing arrangement, wherein the biasing arrangement comprises
    a bias signal generator arranged to provide a bias voltage and a reference voltage;
    a flying capacitor circuitry having a first set of switches connected to said bias signal generator to selectively connecting and disconnecting the bias voltage and reference voltage, respectively, over a capacitor of the flying capacitor circuitry, and the flying capacitor circuitry further having a second set of switches to selectively connecting and disconnecting the voltage over the capacitor to output terminals of the flying capacitor circuitry, wherein the first and second sets of switches are not both in a connecting state at any time; and
    a wired connection between the output terminals of the flying capacitor circuitry and terminals of the input device of the apparatus,
    wherein the input device comprises
    a biasing resistor;
    an analog input arrangement; and
    a signal output,
    wherein the biasing resistor and the analog input arrangement are connected in series between the terminals of the input device, and
    the signal output is connected such that the alternating voltage over the biasing resistor is provided as an output signal.

2. The apparatus according to claim 1, wherein the biasing arrangement further comprises a storage capacitor arranged to be loaded with a charge by the output of the flying capacitor when said second set of switches are in the connecting state, and to provide a voltage to the wired connection.

3. The apparatus according to claim 2, wherein the filter is a low-pass filter with a cut-off frequency that is lower than a switching frequency of operation of the first and second sets of switches.

4. The apparatus according to claim 2, wherein the filter is a notch filter with a stop band frequency that is essentially equal to a switching frequency of operation of the first and second sets of switches.

5. The apparatus according to claim 1, wherein the wired connection further comprises a filter for attenuating switching effects of the flying capacitor circuitry.

6. The apparatus according to claim 1, further comprising a controller arranged to provide control signals to the first and second sets of switches.

7. The apparatus according to claim 6, wherein the controller is arranged to, in repeating sequence,
    put the second set of switches in an off-state;
    put the first set of switches in an on-state;
    after the capacitor has gained a voltage from the bias voltage and the reference voltage, put the first set of switches in an off-state; and
    put the second set of switches in an on-state.

8. The apparatus according to claim 7, wherein the controller is arranged to provide a common open time of the first and second sets of switches before putting any of the sets of switches to an on-state.

9. The apparatus according to claim 1, wherein the reference voltage is a ground voltage.

10. The apparatus according to claim 1, wherein the input device of the apparatus comprises a microphone.

11. The apparatus according to claim 1, wherein the wired connection to the input device further comprises an antenna, wherein the antenna is connected to a radio receiver of the apparatus and separated from an audio input circuitry of the apparatus by a choke coil.

12. The apparatus according to claim 1, further comprising an output device which is also connected by wires, wherein the reference voltage part of the wired connection is used as reference voltage also for an output device.

13. The apparatus according to claim 12, wherein the output device of the apparatus comprises at least one speaker.

14. The apparatus according to claim 1, wherein the wired connection to the input device comprises a connector for detaching the input device from the apparatus.

15. The apparatus according to claim 1, wherein the analog input arrangement comprises
    a field effect transistor having its drain and source connected to terminals of the analog input arrangement; and
    a capacitive sensor connected between gate and source of the field effect transistor.

16. The apparatus according to claim 15, wherein the capacitive sensor is any of a condenser microphone, a microelectromechanical system sensor, and a liquid capacitive inclinometer.

17. The apparatus according to claim 1, further comprising a transistor connected between the biasing resistor and the analog input arrangement with the collector of the transistor connected to the biasing resistor, the emitter of the transistor connected to the analog input arrangement, and the base connected to a voltage for providing a bias point such that a signal swing of the output signal at the connection to the biasing resistor is provided.

18. The apparatus according to claim 1, wherein the signal output comprises connections to respective terminals of the biasing resistor, and at least one of the connections comprises a capacitor for alternating current coupling of the output signal.

19. An electronic apparatus having reduced electromagnetic interference sensitivity, the electronic apparatus comprising:
    a connector configured to be connected to input and output signals from a headset including a wire and a microphone;
    a bias signal generator configured to generate a bias voltage and a reference voltage for biasing the microphone;
    a flying capacitor circuitry comprising:
        a capacitor,
        a first set of switches operatively connected to the bias signal generator to selectively connect and disconnect the bias voltage and the reference voltage for biasing the microphone, respectively, to the capacitor of the flying capacitor circuitry, and
        a second set of switches to selectively connect and disconnect the capacitor of the flying capacitor circuitry to an output of the flying capacitor circuitry to provide the bias voltage and the reference voltage for biasing the microphone to the output of the flying capacitor circuitry;
    a controller configured to operate the first set of switches and the second set of switches such that the first set of switches and the second set of switches are not both in a connected state simultaneously; and
    wherein the output of the flying capacitor circuitry is operatively connected to the connector such that the bias voltage and the reference voltage are transmitted through the wire to bias the microphone.

20. The electronic apparatus of claim 19, wherein the electronic apparatus is at least one of a mobile phone and a media player/recorder.

21. The electronic apparatus of claim 19, further comprising a storage capacitor arranged to be loaded with a charge by the output of the flying capacitor when the second set of switches are in the connecting state, and to provide a voltage to the connector such that the bias voltage and the reference voltage are transmitted through the wire to bias the microphone.

22. The electronic apparatus of claim 19, further comprising:
a filter operatively connected between the output of the flying capacitor and the connector for attenuating switching effects of the flying capacitor circuitry.

23. The electronic apparatus of claim 22, wherein the filter is a low-pass filter with a cut-off frequency that is lower than a switching frequency of operation of the first and second sets of switches.

24. The electronic apparatus of claim 22, wherein the filter is a notch filter with a stop band frequency that is essentially equal to a switching frequency of operation of the first and second sets of switches.

25. The electronic apparatus of claim 19, wherein the controller is arranged to, in repeating sequence,
put the second set of switches in an off-state;
put the first set of switches in an on-state;
after the capacitor has gained a voltage from the bias voltage and the reference voltage, put the first set of switches in an off-state; and
put the second set of switches in an on-state.

26. The electronic apparatus of claim 19, wherein the controller is arranged to provide a common open time of the first and second sets of switches before putting any of the sets of switches to an on-state.

27. The electronic apparatus of claim 19, wherein the reference voltage is a ground voltage.

28. A biasing method for an electronic apparatus having reduced electromagnetic interference sensitivity, the method comprising
generating a bias signal for biasing a microphone connected to the electronic apparatus by a wired connection;
controlling a flying capacitor circuitry, wherein the controlling the flying capacitor circuitry comprises:
selectively connecting and disconnecting a first set of switches of the flying capacitor circuitry to connect the bias signal for biasing the microphone to a capacitor of the flying capacitor circuitry, and
selectively connecting and disconnecting a second set of switches of the flying capacitor circuitry to selectively connect and disconnect the capacitor of the flying capacitor circuitry to an output of the flying capacitor circuitry to provide the bias signal for biasing the microphone to the output of the flying capacitor circuitry,
wherein the controlling the flying capacitor circuitry further comprises alternatingly opening the first set of switches and closing the second set of switches, and opening the second set of switches and closing the second set of switches such that the first and second sets of switches are not both in a connecting state at any time; and
biasing the microphone by providing the bias signal for biasing the microphone from the output of the flying capacitor circuitry to the wired connection.

29. The method according to claim 28, further comprising:
loading a storage capacitor with a charge by the output of the flying capacitor when said second set of switches are in the connecting state, and biasing the microphone by providing the bias signal for biasing the microphone from the output of the flying capacitor circuitry to the wired connection from the storage capacitor.

30. The method according to claim 28, further comprising filtering the output signal of the flying capacitor circuitry for attenuating switching effects of the flying capacitor circuitry.

31. The method according to claim 30, wherein the filtering comprises low-pass filtering with a cut-off frequency that is lower than a switching frequency of the alternating operation of the first and second sets of switches.

32. The method according to claim 30, wherein the filtering comprises notch filtering with a stop band frequency that is essentially equal to a switching frequency of the alternating operation of the first and second sets of switches.

33. The method according to claim 28, wherein the controlling comprises, in repeating sequence,
putting the second set of switches in an off-state;
putting the first set of switches in an on-state;
after the capacitor has gained a voltage from the bias voltage and the reference voltage, putting the first set of switches in an off-state; and
putting the second set of switches in an on-state.

34. The method according to claim 28, wherein the controlling comprises providing a common open time of the first and second sets of switches before putting any of the sets of switches to an on-state by delaying closing of the switches.

* * * * *